United States Patent
Parker-Wood et al.

(10) Patent No.: US 9,798,876 B1
(45) Date of Patent: Oct. 24, 2017

(54) SYSTEMS AND METHODS FOR CREATING SECURITY PROFILES

(71) Applicant: Symantec Corporation, Mountain View, CA (US)

(72) Inventors: Aleatha Parker-Wood, Palo Alto, CA (US); Anand Kashyap, Los Altos, CA (US); Christopher Gates, Culver City, CA (US); Kevin Roundy, El Segundo, CA (US); Leylya Yumer, Antibes (FR); Sandeep Bhatkar, Sunnyvale, CA (US); Yin Liu, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 155 days.

(21) Appl. No.: 14/829,676

(22) Filed: Aug. 19, 2015

(51) Int. Cl.
   *G06F 21/55* (2013.01)
   *H04L 29/06* (2006.01)

(52) U.S. Cl.
   CPC .......... *G06F 21/554* (2013.01); *G06F 21/552* (2013.01); *H04L 63/102* (2013.01); *G06F 2221/034* (2013.01)

(58) Field of Classification Search
   CPC ...... H04L 63/102; H04L 67/30; H04L 67/306
   See application file for complete search history.

(56) References Cited

U.S. PATENT DOCUMENTS

| | | | |
|---|---|---|---|
| 8,864,847 B1 | 10/2014 | Casaburi et al. | |
| 8,911,507 B1 | 12/2014 | Gilbert et al. | |
| 2003/0105971 A1 | 6/2003 | Angelo et al. | |
| 2004/0098594 A1* | 5/2004 | Fleming | G06F 21/604 713/182 |
| 2008/0033637 A1 | 2/2008 | Kuhlman et al. | |
| 2009/0201149 A1 | 8/2009 | Kaji | |
| 2010/0100972 A1 | 4/2010 | Lemieux et al. | |
| 2010/0175116 A1 | 7/2010 | Gum | |
| 2010/0205187 A1 | 8/2010 | Bertagna | |

(Continued)

OTHER PUBLICATIONS

PP, Raju, "6 Ways to Track and Recover Your Lost/Stolen iPhone", http://techpp.com/2009/09/18/6-ways-to-find-track-lost-stolen-iphone-free/, as accessed on Aug. 24, 2011, Technology Personalized, (Sep. 18, 2009).

(Continued)

*Primary Examiner* — Izunna Okeke
(74) *Attorney, Agent, or Firm* — FisherBroyles LLP

(57) ABSTRACT

A computer-implemented method for creating security profiles may include (1) identifying, within a computing environment, a new actor as a target for creating a new security behavior profile that defines expected behavior for the new actor, (2) identifying a weighted graph that connects the new actor as a node to other actors, (3) creating, by analyzing the weighted graph, the new security behavior profile based on the new actor's specific position within the weighted graph, (4) detecting a security anomaly by comparing actual behavior of the new actor within the computing environment with the new security behavior profile that defines expected behavior for the new actor, and (5) performing, by a computer security system, a remedial action in response to detecting the security anomaly. Various other methods, systems, and computer-readable media are also disclosed.

20 Claims, 6 Drawing Sheets

(56) References Cited

U.S. PATENT DOCUMENTS

| | | | |
|---|---|---|---|
| 2010/0311443 | A1 | 12/2010 | Abuelsaad et al. |
| 2011/0238476 | A1 | 9/2011 | Carr et al. |
| 2012/0011559 | A1 | 1/2012 | Miettinen et al. |
| 2012/0266236 | A1 | 10/2012 | Miwa et al. |
| 2015/0106926 | A1* | 4/2015 | Basavapatna ......... G06F 21/552 726/22 |

OTHER PUBLICATIONS

Joe, "How to recover from a lost or stolen iPhone", http://www.nextadvisor.com/blog/2008/07/29/how-to-recover-from-a-lost-or-stolen-iphone/, as accessed on Aug. 24, 2011, NextAdvisor, (Jul. 29, 2008).

"Locating stolen Iphone?", http://forums.wireless.att.com/t5/Apple-iPhone/Locating-stolen-Iphone/td-p/1441267, as accessed on Aug. 24, 2011, AT&T Community Support, (Dec. 28, 2007).

"Report Lost or Stolen iPhone", http://www.stolen-property.com/report-stolen-iPhone.php, as accessed on Aug. 24, 2011, Stolen-Property, (on or before Aug. 24, 2011).

"iPhone Theft Prevention", http://www.stolen-property.com/iphone-theft-prevention.php, as accessed on Aug. 24, 2011, Stolen-Property, (on or before Aug. 24, 2011).

Szurdi, Janos et al., "The Long "Taile" of Typosquatting Domain Names", https://www.cs.uic.edu/~ckanich/papers/long.taile.pdf, as accessed Jul. 21, 2015, 23rd USENIX Security Symposium, (Aug. 20-22, 2014).

"Symantec Announces New Strategy to Fuel Growth and Plans to Separate into Two Public Industry-Leading Technology Companies", http://investor.symantec.com/investor-relations/press-releases/press-release-details/2014/Symantec-Announces-New-Strategy-to-Fuel-Growth-and-Plans-to-Separate-into-Two-Public-Industry-Leading-Technology-Companies/default.aspx, as accessed Jul. 21, 2015, Symantec Corporation, (Oct. 9, 2014).

Trevisiol, Michele et al., "Cold-start News Recommendation with Domain-dependent Browse Graph", http://www.micheletrevisiol.com/papers/recsys2014_trevisiol.pdf, as accessed Jul. 21, 2015, RecSys'14, Foster City, Silicon Valley, CA, USA, (Oct. 6-10, 2014).

Leroy, Vincent et al., "Cold Start Link Prediction", http://www.francescobonchi.com/kdd2010.pdf, as accessed Jul. 21, 2015, KDD'10, Washington, DC, USA, (Jul. 25-28, 2010).

Wang, Yilun et al., "Hybrid Rating Prediction using Graph Regularization from Network Structure", http://snap.stanford.edu/class/cs224w-2014/projects2014/cs224w-87-final.pdf, as accessed Jul. 21, 2015, (on or before Jul. 21, 2015).

Lin, Jovian et al., "Addressing Cold-Start in App Recommendation: Latent User Models Constructed from Twitter Followers", https://www.comp.nus.edu.sg/~kanmy/papers/fp093-lin.pdf, as accessed Jul. 21, 2015, SIGIR'13, Dublin, Ireland, (Jul. 28-Aug. 1, 2013).

Moghaddam, Samaneh et al., "The FLDA Model for Aspect-based Opinion Mining: Addressing the Cold Start Problem", http://www2013.org/proceedings/p909.pdf, as accessed Jul. 21, 2015, WWW 2013, Rio de Janeiro, Brazil, (May 13-17, 2013).

Sharma, Mohit et al., "Feature-based factorized Bilinear Similarity Model for Cold-Start Top-n Item Recommendation", http://glaros.dtc.umn.edu/gkhome/fetch/papers/bilinear.pdf, as accessed Jul. 21, 2015, 2015 SIAM International Conference on Data Mining (SDM15), Vancouver, B.C., Canada, (Apr. 30-May 2, 2015).

"Gadget Trak", http://www.gadgettrak.com/, as accessed Jun. 25, 2012, (Apr. 15, 2007).

"STOP—Security Tracking of Office Property", http://www.stoptheft.com/site/index.php, as accessed Jun. 25, 2012, (Apr. 11, 2005).

Ghadialy, Zahid, "New Technologies for Mobile Phone Theft prevention", http://3g4g.blogspot.com/2010/02/newtechnologies-for-mobile-phone-theft.html, as accessed Jun. 25, 2012, (Feb. 15, 2010).

"Anti-theft system", https://en.wikipedia.org/wiki/Anti-theft_system, as accessed Jun. 25, 2012, Wikipedia, (May 1, 2005).

"HarryG Security", http://www.harrygs.com/, as accessed Jun. 25, 2012, (Apr. 1, 2004).

"Mississippi Code of 1972, Sec. 97-23-93.1.—Shoplifting", http://www.mscode.com/free/statutes/97/023/0093_1.htm, as accessed Jun. 25, 2012, (on or before Oct. 18, 2002).

"MobileMe", https://en.wikipedia.org/wiki/MobileMe, as accessed Aug. 24, 2011, Wikipedia, (Jun. 13, 2008).

"Find My iPhone, iPad, and Mac", http://www.apple.com/icloud/find-my-iphone.html, as accessed Aug. 24, 2011, Apple Inc., (on or before Aug. 24, 2011).

Michael Hart, et al.; Method to Detect Malicious Behavior by Computing the Likelihood of Data Access; U.S. Appl. No. 14/690,171, filed Apr. 17, 2015.

* cited by examiner

SYSTEMS AND METHODS FOR CREATING SECURITY PROFILES

BACKGROUND

Individuals and organizations typically attempt to protect their computing resources from malicious attacks and other security risks. Accordingly, the individuals and organizations may employ security software products that monitor the computing resources, attempt to detect potential security risks, and take remedial action in response to detecting one or more security risks.

For example, security software products may whitelist and blacklist files and then monitor computer activity for instances of the files. Upon detecting one or more previously classified files, the security software products may check the files against the corresponding whitelists and blacklists, thereby determining whether access to the files should be permitted, blocked, or otherwise inhibited.

Similarly, security software products may define expected behavior for an entity within a computing environment. The security software products may also check the actual behavior of the entity against the previously defined expected behavior. Nevertheless, these monitoring systems may fail to perform optimally along one or more dimensions, as discussed further below. Accordingly, the instant disclosure identifies and addresses a need for additional and improved systems and methods for creating security profiles.

SUMMARY

As will be described in greater detail below, the instant disclosure generally relates to systems and methods for creating security profiles by, for example, newly generating security behavior profiles that are customized based on a new actor's position within a weighted graph. In one example, a computer-implemented method for creating security profiles may include (1) identifying, within a computing environment, a new actor as a target for creating a new security behavior profile that defines expected behavior for the new actor, (2) identifying a weighted graph that connects the new actor as a node to other actors, (3) creating, by analyzing the weighted graph that connects the new actor to the other actors, the new security behavior profile that defines expected behavior for the new actor based on the new actor's specific position within the weighted graph, (4) detecting a security anomaly by comparing actual behavior of the new actor within the computing environment with the new security behavior profile that defines expected behavior for the new actor, and (5) performing, by a computer security system, a remedial action in response to detecting the security anomaly.

In one embodiment, the new actor may include one of: (1) a user account, (2) a physical server, and (3) a file. In some embodiments, identifying, within the computing environment, the new actor as the target for creating the new security behavior profile may include identifying the new actor as newly inserted within the computing environment.

In one embodiment, identifying, within the computing environment, the new actor as the target for creating the new security behavior profile may include determining that the computer security system lacks a security behavior profile for the new actor. In some examples, identifying the weighted graph that connects the new actor as the node to other actors may include creating the weighted graph.

In some examples, creating the weighted graph may include identifying a data structure that indicates a position of the new actor within a network of actors having a same type categorization and creating the weighted graph based on the data structure. In one embodiment, the data structure may include an organizational chart that indicates a hierarchy between individuals within a corresponding organization. In some examples, creating the new security behavior profile based on the new actor's specific position within the weighted graph may include copying another security behavior profile as the new security behavior profile.

In one embodiment, the new actor replaces another actor within the computing environment. In some examples, creating the new security behavior profile based on the new actor's specific position within the weighted graph includes calculating an average edge value of connections that connect the new actor to neighbors within the weighted graph. In one embodiment, detecting the security anomaly may include determining that the actual behavior of the new actor differs from expected behavior defined by the new security behavior profile beyond a predefined threshold.

In one embodiment, a system for implementing the above-described method may include (1) an identification module, stored in memory, that (A) identifies, within a computing environment, a new actor as a target for creating a new security behavior profile that defines expected behavior for the new actor and (B) identifies a weighted graph that connects the new actor as a node to other actors, (2) a creation module, stored in memory, that creates, by analyzing the weighted graph that connects the new actor to the other actors, the new security behavior profile that defines expected behavior for the new actor based on the new actor's specific position within the weighted graph, (3) a detection module, stored in memory, that detects a security anomaly by comparing actual behavior of the new actor within the computing environment with the new security behavior profile that defines expected behavior for the new actor, (4) a performance module, stored in memory, that performs a remedial action in response to detecting the security anomaly, and (5) at least one physical processor configured to execute the identification module, the creation module, the detection module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify, within a computing environment, a new actor as a target for creating a new security behavior profile that defines expected behavior for the new actor, (2) identify a weighted graph that connects the new actor as a node to other actors, (3) create, by analyzing the weighted graph that connects the new actor to the other actors, the new security behavior profile that defines expected behavior for the new actor based on the new actor's specific position within the weighted graph, (4) detect a security anomaly by comparing actual behavior of the new actor within the computing environment with the new security behavior profile that defines expected behavior for the new actor, and (5) perform, by a computer security system, a remedial action in response to detecting the security anomaly.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
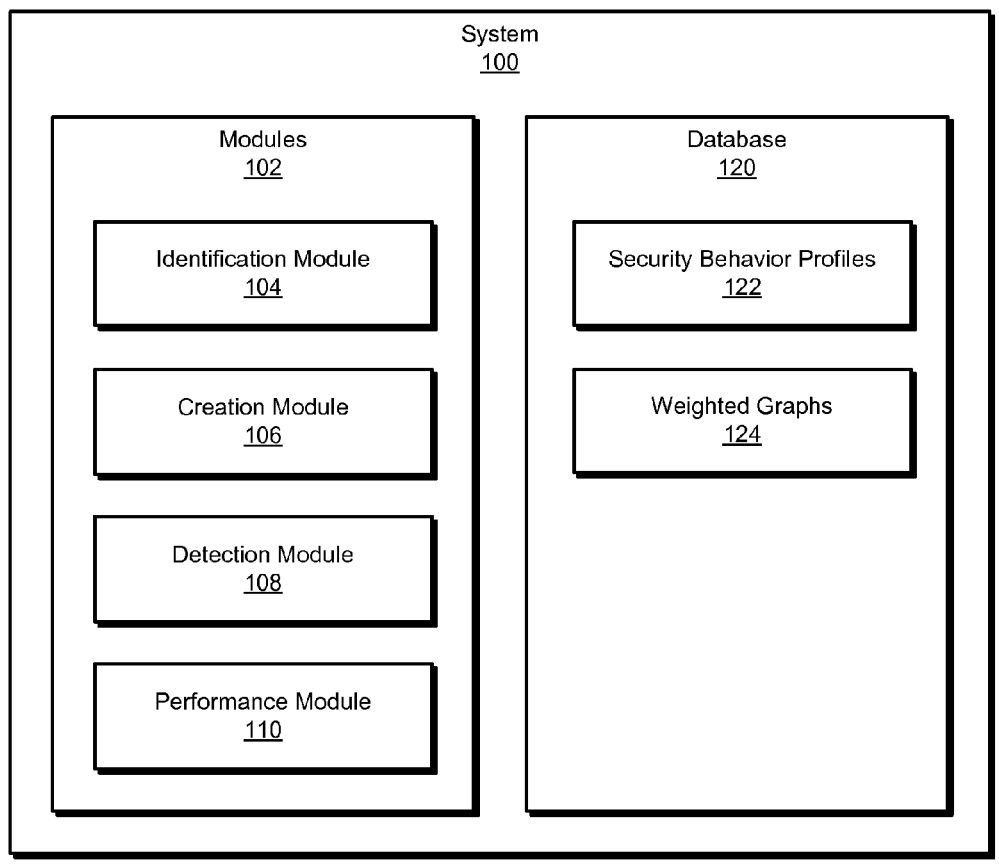
FIG. 1 is a block diagram of an exemplary system for creating security profiles.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for creating security profiles. As will be explained in greater detail below, the systems and methods disclosed herein overcome the problem of generating security profiles of expected behavior for newly discovered actors when corresponding security systems have not yet recorded any previous actual behavior on which to base the security profiles. Specifically, the systems and methods disclosed herein may overcome that problem by leveraging the security profiles of graph neighbors as substitutes, models, and/or defaults for the newly discovered actors. Moreover, the systems and methods disclosed herein may also overcome the problem of expected behavior being defined the same for each member of a group of actors within a network computing environment. Specifically, the systems and methods disclosed herein may improve upon other methods by customizing or personalizing a security behavior profile that defines expected behavior based on the specific or unique position of each user within a corresponding weighted graph (e.g., such that the security behavior profile for each user is substantially or entirely unique to that user).

Figure 2:
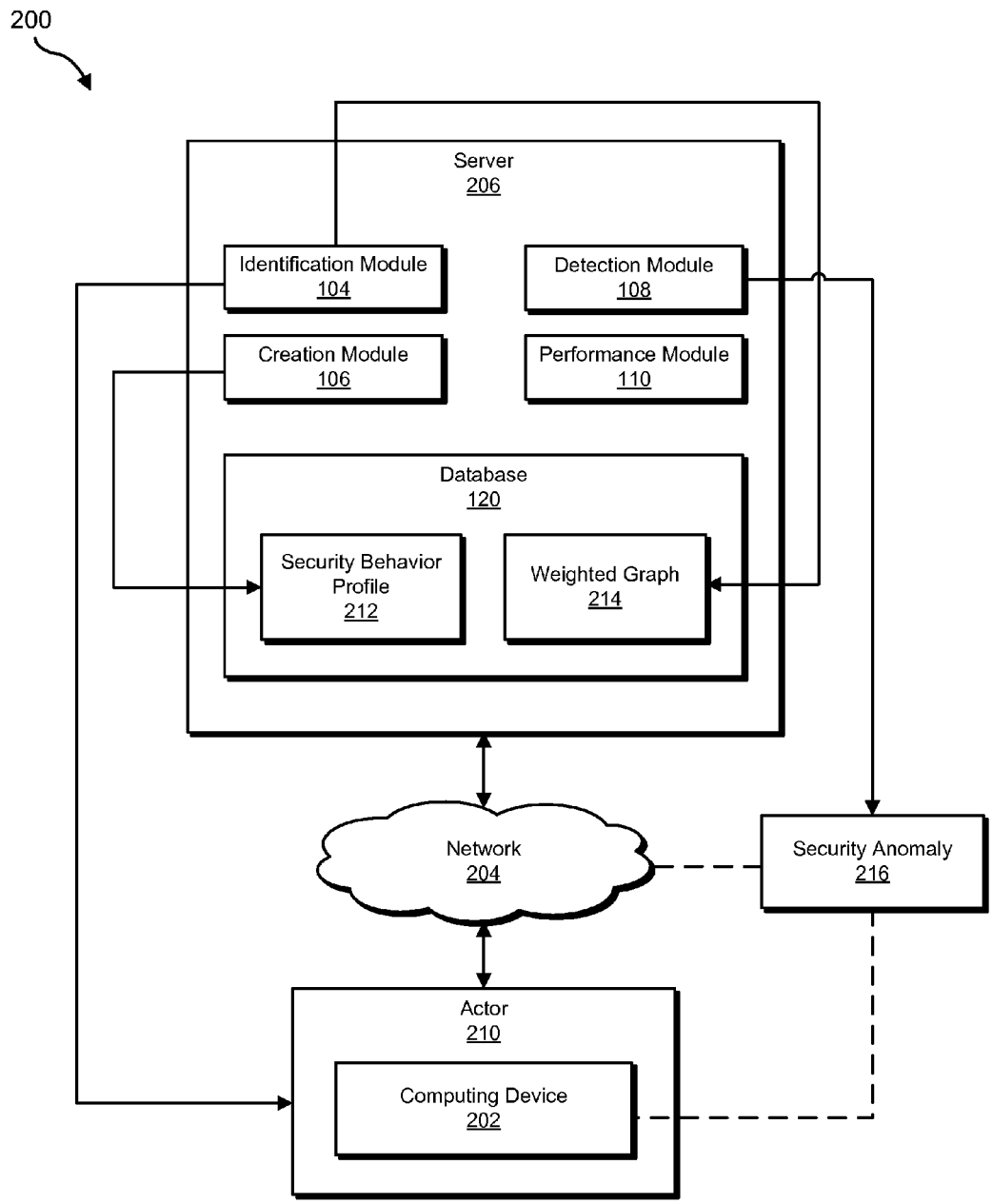
FIG. 2 is a block diagram of an additional exemplary system for creating security profiles.

The following will provide, with reference to FIGS. 1-2, detailed descriptions of exemplary systems for creating security profiles. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for creating security profiles. As illustrated in this figure, exemplary system 100 may include one or more modules 102 for performing one or more tasks. For example, and as will be explained in greater detail below, exemplary system 100 may also include an identification module 104 that may identify, within a computing environment, a new actor as a target for creating a new security behavior profile that defines expected behavior for the new actor. Identification module 104 may also identify a weighted graph that connects the new actor as a node to other actors. Exemplary system 100 may additionally include a creation module 106 that may create, by analyzing the weighted graph that connects the new actor to the other actors, the new security behavior profile that defines expected behavior for the new actor based on the new actor's specific position within the weighted graph. Exemplary system 100 may also include a detection module 108 that may detect a security anomaly by comparing actual behavior of the new actor within the computing environment with the new security behavior profile that defines expected behavior for the new actor. Furthermore, exemplary system 100 may include a performance module 110 that may perform a remedial action in response to detecting the security anomaly. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store security behavior profiles 122, which may define expected behavior for one or more actors within a computing environment, as discussed further below. Similarly, database 120 may be configured to store weighted graphs 124, which may constitute mathematical weighted graphs defining relationships between actors, such as users, servers, and/or files, within the computing environment, as also discussed further below.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to create security profiles. For example, and as will be described in greater detail below, identification module 104 may identify, within a computing environment, a new actor 210 (which may correspond to computing device 202) as a target for creating a new security behavior profile 212 that defines expected behavior for new actor 210. Identification module 104 may identify a weighted graph 214 that connects new actor 210 as a node to other actors. Creation module 106 may create, by analyzing weighted graph 214 that connects new actor 210 to the other actors, new security behavior profile 212 that defines expected behavior for new actor 210 based on the new actor's specific position within the weighted graph. Detection module 108 may detect a security anomaly 216 by comparing actual behavior of new actor 210 within the computing environment with new security behavior profile 212 that defines expected behavior for new actor 210. Performance module 110 may perform, as part of a computer security system (e.g. system 200), a remedial action in response to detecting security anomaly 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of creating security profiles and/or applying the security profiles in accordance with method 300 or equivalent methods, as discussed further below. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
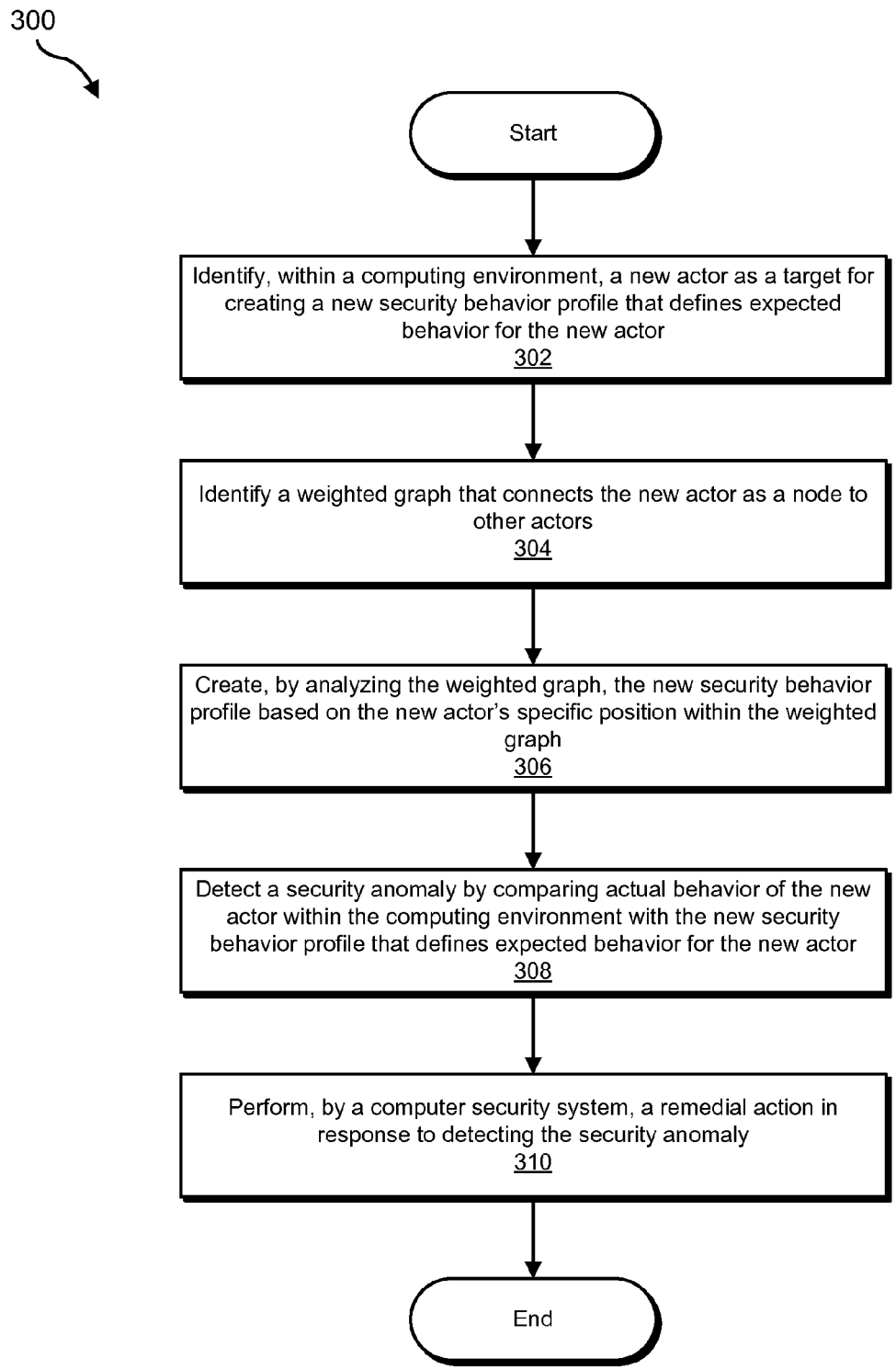
FIG. 3 is a flow diagram of an exemplary method for creating security profiles.

FIG. 3 is a flow diagram of an exemplary computer-implemented method 300 for creating security profiles. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may identify, within a computing environment, a new actor as a target for creating a new security behavior profile that defines expected behavior for the new actor. For example, identification module 104 may, as part of server 206 in FIG. 2, identify, within a computing environment, new actor 210 as a target for creating new security behavior profile 212 that defines expected behavior for new actor 210.

As used herein, the term "new actor" generally refers to an entity within a computing environment that (1) a security system newly discovers and that (2) behaves within the computing environment in a manner that the security system can predict and evaluate. In general, the new actor may be newly inserted within the computing environment. Accordingly, the new actor may lack any previous security behavior profile defining expected behavior for the new actor. Similarly, the security system may lack any previously recorded behavior from the new actor on which to base a security behavior profile that defines expected behavior for the new actor. In other words, without previously recorded behavior, the security system may experience difficulty in defining expected future behavior for the new actor. The systems and methods disclosed herein may overcome this potential difficulty by leveraging security behavior profiles for network neighbors of the new actor within a weighted graph to define a newly generated security behavior profile for the new actor, as discussed further below.

As used herein, the term "security behavior profile" generally refers to any security profile that defines expected behavior for a corresponding actor. The security behavior profile may define expected behavior in terms of one or more thresholds, ranges, frequencies, and/or counts, of corresponding events, which may be categorized as innocuous, suspicious, and/or malicious. For example, the security behavior profile may define an amount, frequency, and/or acceleration of specific events, such as requests, packets, logins, overrides, accesses, successful attempts, unsuccessful attempts, inputs, outputs, messages, emails, and/or commands. Similarly, the security behavior profile may define one or more ranges or bands, which may be open-ended on one, both, or neither end of the range, in which one or more measured values are permitted, not permitted, and/or categorized as safe, suspicious, and/or malicious.

In some examples, the security behavior profile may also include a risk profile or risk value, thereby indicating a measurement of the estimated degree of risk posed by the corresponding actor. For example, a security system may grade users and/or files on a scale from 0 to 1 indicating an estimated degree of how safe (e.g., 0) or malicious (e.g., 1) the corresponding actor is. Alternatively, the security behavior profile in method 300 may be substituted with a risk profile that indicates an estimated risk, as discussed above, without necessarily indicating expected or predicted behavior. In these cases, system 100 may ensure that the risk profile or risk score for the new actor is not less than a minimum and/or maximum risk score of the new actor's nearest (e.g., 1-hop) neighbors within the weighted graph, as discussed further below.

Identification module 104 may identify the new actor in a variety of ways. In some examples, identification module 104 may continuously or periodically monitor the computing environment for the appearance of new actors. Identification module 104 may detect the new presence of the new actor in response to performing the continuous or periodic monitoring. Additionally, or alternatively, identification module 104 may identify the new actor in response to receiving information (e.g., a network packet) that indicates or designates the arrival of the new actor. In some examples, the information may be received from the new actor itself. For example, the computing environment or network environment may require one or more new actors (e.g., new actors of a specific type) to perform one or more acts in a registration process. The registration process may be required by the network and/or a security system that protects the network in order to access the network. The registration process may include one or more network handshakes that establish corresponding network connections. Identification module 104 may receive the information that indicates or designates the arrival of the new actor in response to one or more acts of the registration process.

In further examples, identification module 104 may query one or more network resources, such as a network database, a network table, a server, and/or a router, for the identification of some or all present network entities and/or newly arrived network entities. Identification module 104 may identify the new actor in response to performing the querying.

In one embodiment, the new actor may include one of: (1) a user account, (2) a physical server, and (3) a file. The new actor may also include any network hardware device, any network software component, any program/script/agent, any individual/owner/administrator, and/or any peripheral device. In further examples, the new actor may constitute a web server and/or point-of-sale device. In these examples, system 100 may optionally obtain an underlying map, graph, and/or data structure indicating connections between the web server and/or point-of-sale device and other same-type actors from another security system, vendor, organization, and/or other third-party source. In other examples, the data structure may correspond to an organizational chart, directory tree, file system layout, collaboration group chart, and/or any other suitable data structure. In general, the new actor may include any entity that behaves within the computing environment in a manner that can be measured, predicted, and/or evaluated. For example, the new actor may correspond to any entity that receives and/or transmits traffic on the network.

In one embodiment, identification module 104 may identify, within the computing environment, the new actor as the target for creating the new security behavior profile by identifying the new actor as newly inserted within the computing environment. For example, a new user may be given a new user account, a file may be added to a volume or file system, and/or a physical server or other network device may be newly connected to a network environment. In other examples, identification module 104 may identify, within the computing environment, the new actor as the target for creating the new security behavior profile by determining that the computer security system lacks a security behavior profile for the new actor, thereby indicating a need to create the security behavior profile.

At step 304, one or more of the systems described herein may identify a weighted graph that connects the new actor as a node to other actors. For example, identification module 104 may, as part of server 206 in FIG. 2, identify weighted graph 214 that connects new actor 210 as a node to other actors. As used herein, the term "weighted graph" generally refers to a mathematical weighted graph defined in terms of nodes and edges between those nodes such that the edges specify values indicating corresponding weights.

Identification module 104 may identify the weighted graph in a variety of ways. In some examples, identification module 104 may identify the weighted graph that connects the new actor as the node to other actors by creating the weighted graph. For example, identification module 104 may identify a data structure that indicates a position of the new actor within a network of actors having a same type categorization (e.g., user account, file, network device) and create the weighted graph based on the data structure. More specifically, identification module 104 may identify an organizational chart that indicates a hierarchy between individuals within a corresponding organization. Similarly, identification module 104 may identify a file structure hierarchy that indicates a hierarchy between corresponding files, directories, and/or volumes within a file system. Additionally, identification module 104 may identify a physical, logical, and/or network map or table that identifies physical, logical, and/or network addresses indicating addresses, distances, and/or relationships between corresponding data, storage areas, files, directories, servers, web addresses, and/or network devices. Identification module 104 may generate the weighted graph based on the organizational chart, the file structure hierarchy, and/or the corresponding map, as discussed above.

In some examples, identification module 104 may also generate the organizational chart, file structure hierarchy, and/or corresponding map, as discussed above. In other examples, identification module 104 may receive one or more of these items. For example, identification module 104 may request one or more of these items from another network resource. Alternatively, identification module 104 may receive one or more of these items preemptively without identification module 104 first requesting the items. Similarly, identification module 104 may, in other embodiments, receive the weighted graph without generating the weighted graph.

Figure 4:
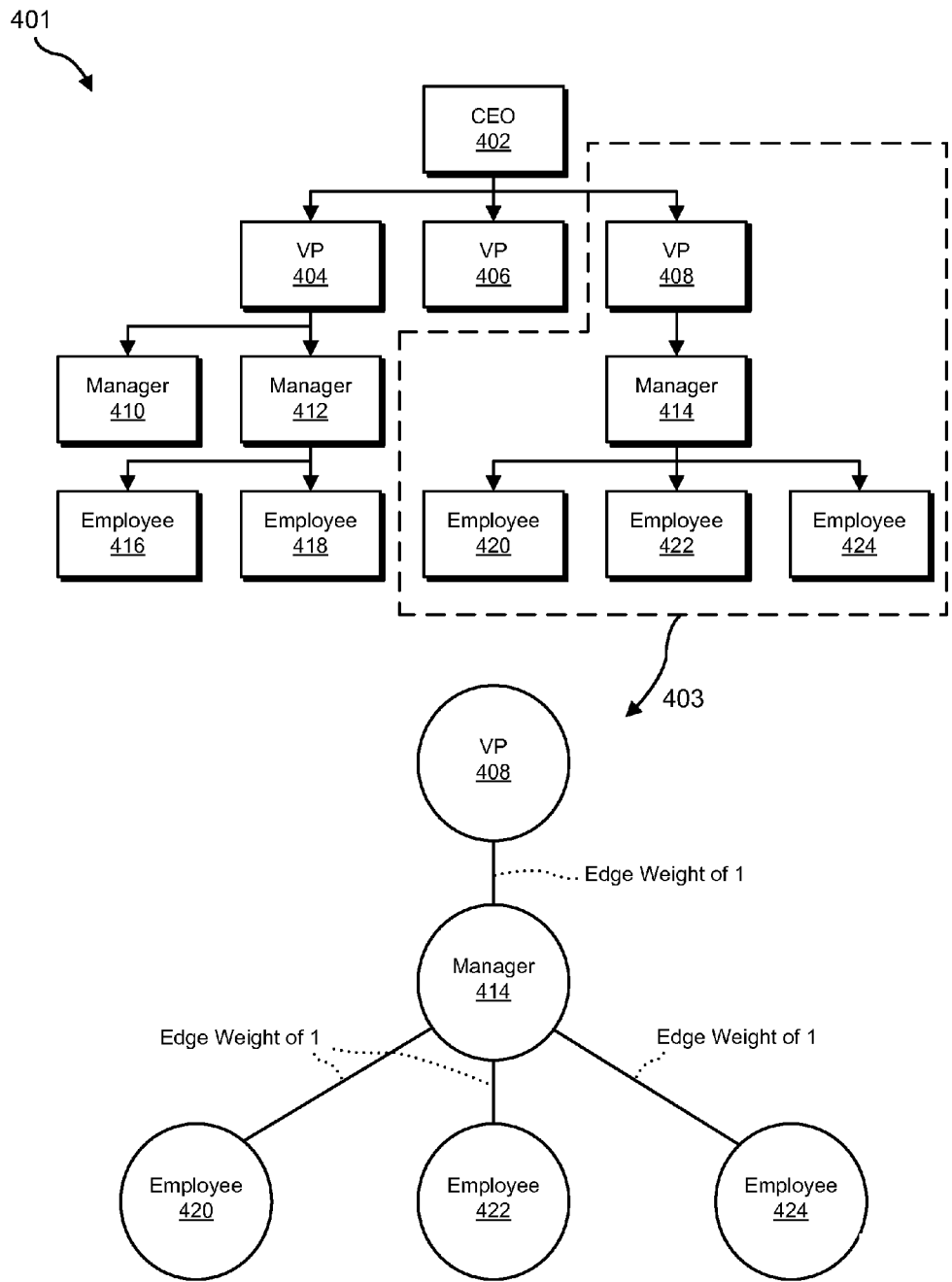
FIG. 4 is a block diagram of an exemplary organizational hierarchy and an exemplary weighted graph used in systems and methods for creating security profiles.

FIG. 4 illustrates an example of an exemplary organizational hierarchy 401, which may form the basis for a weighted graph 403, as discussed further below. As shown in FIG. 4, organizational hierarchy 401 may include a CEO 402, a VP 404, a VP 406, a VP 408, a manager 410, a manager 412, a manager 414, an employee 416, an employee 418, an employee 420, an employee 422, and an employee 424. Organizational hierarchy 401 further indicates the organizational relationships between these respective members of the corresponding organization. For example, employee 422 reports to manager 414, who in turn reports to VP 408, who in turn reports to CEO 402. Notably, organizational hierarchy 401 does not necessarily indicate any weights for the edges that connect different members of the organization. Accordingly, identification module 104 may create the weighted graph at least in part by adding or defining weights for edges between nodes of another chart, graph, and/or hierarchy. In these examples, identification module 104 may make the weights for all of the edges the same. Alternatively, identification module 104 may alter or adjust the weights for one or more edges based on the positions of the edges within the weighted graph, based on one or more nodes that the edges connect, and/or based on any other feature indicating a relative strength or weakness of one edge in comparison to another edge.

As further shown in FIG. 4, identification module 104 may create the weighted graph based on all or part of another data structure, such as a chart, map, and/or organizational hierarchy, such as organizational hierarchy 401. Specifically, identification module 104 may create weighted graph 403 based on a part of organizational hierarchy 401. Additionally, FIG. 4 further shows that identification module 104 has added weights to the edges of the portion of organizational hierarchy 401 used as the basis for weighted graph 403. In the example of FIG. 4, the edges between different nodes of the weighted graph have the weight of 1. In other examples, the edges may have different or varying weights, which may be based on one or more specific features of the nodes connected by the edges and/or other features of the nodes or their positions within the weighted graph.

In some examples, identification module 104 may select all or part of an underlying graph, map, and/or chart as the basis for the weighted graph. For example, identification module 104 may identify a position of the new actor within the underlying map and then select all of the nodes and/or edges that fit within a predefined distance or threshold from that position. Additionally or alternatively, identification module 104 may select all of the nodes and/or edges that fit within a one hop, two hop, three hop, and/or N hop distance from the new actor. Similarly, additionally or alternatively, identification module 104 may execute a clustering algorithm that identifies clusters within the underlying data structure and then limits the weighted graph to the cluster that includes the new actor. For example, the clustering algorithm may identify clusters as collaboration groups, groups within a corporation, a physical location for storing one or more network devices, a rack for connecting servers, an immediate parent directory, a second-level or N-level parent directory, a volume, and/or a partition, etc.

At step 306, one or more of the systems described herein may create, by analyzing the weighted graph that connects the new actor to the other actors, the new security behavior profile that defines expected behavior for the new actor based on the new actor's specific position within the weighted graph. For example, creation module 106 may, as part of server 206 in FIG. 2, create, by analyzing weighted graph 214 that connects new actor 210 to the other actors, new security behavior profile 212 that defines expected behavior for new actor 210 based on the new actor's specific position within the weighted graph.

Creation module 106 may create the new security behavior profile in a variety of ways. In some examples, creation module 106 may create the new security behavior profile based on the new actor's specific position within the weighted graph by copying another security behavior profile as the new security behavior profile. Notably, in further examples, the other security behavior profile may be created in a manner parallel to the creation of the new security behavior profile for the new actor. In related examples, the new actor may replace another actor within the computing environment. For example, creation module 106 may identify the new actor (e.g., a user, user account, file, and/or physical network device such as a server) as a replacement for, a new version of, and/or an entity corresponding to a previous actor. More specifically, an individual may replace another individual within a hierarchy, a new version of a file or executable may replace an earlier and outdated version of the file or executable, and/or a physical server or other network device may replace another physical server or network device within the same physical position or network connection. The previous actor may already possess a security behavior profile. In some examples, the new actor may function as a replacement or substitute for the previous actor, which may be optionally removed from the computing environment. In these examples, the new actor may take over the previous security behavior profile for the previous actor as a default security behavior profile pending adjustment or modification in response to actual behavior by the new actor. Notably, system 100 may also provide a user or administrator with the option of selecting between (1) creating the security behavior profile based on a weighted average of one or more values from security behavior profiles for neighbors within the weighted graph and/or (2) creating the security behavior profile by cloning a previous security behavior profile (e.g., a previous security behavior profile for another actor that is determined to be most similarly situated within the weighted graph as the new actor and/or for another actor that the new actor is replacing, as discussed above).

In further examples, creation module 106 may create the security behavior profile at least in part by calculating an average edge value of connections that connect the new actor to neighbors within the weighted graph. As used herein, the term "neighbors" generally refers to two nodes directly or indirectly connected within the weighted graph. For example, creation module 106 may create the security behavior profile based on a multitude of security behavior profiles for neighbors of the new actor. In these examples, creation module 106 may discount the influence of the security behavior profile for another node on the creation of the security behavior profile for the new actor based on a distance or combined edge weight between the other node and the new actor. In other words, a node three hops away from the new actor may have less influence on the new security behavior profile than a node two hops away from the new actor, which may in turn have less influence than a node one hop away. In general, creation module 106 may calculate an average and/or combined value for any value within corresponding security behavior profiles such that the input of each previous security behavior profile is proportional to the distance or edge weight between the respective security behavior profile and the new actor within the weighted graph.

In the example of FIG. 4, the influence of employee 422 on the creation of a security behavior profile for VP 408 may be proportionally less than the influence of manager 414, because the distance between VP 408 and manager 414 is less than the distance between VP 408 and employee 422 (i.e., the distance corresponding to edge weight one is less than the combined distance corresponding to edge weight two). More specifically, creation module 106 may base the creation of a new security behavior profile for VP 408 on the security behavior profiles of neighbors corresponding to manager 414, employee 420, employee 422, and employee 424. In that case, the security behavior profile for manager 414 may have more weight or influence than the security behavior profiles for the employees, based on the respective distances or combined edge weights of these neighbors, as outlined above. Notably, creation module 106 may calculate the weighted average of one or more values for security behavior profiles of all of these neighbors to create the new security behavior profile for VP 408. In other examples, creation module 106 may calculate the combined edge weight based on a multiplication or product instead of a summation or addition. Creation module 106 may use this technique (e.g., making the influence of other security behavior profiles proportional to the graph distance) in addition and/or an alternative to selecting a subset of the underlying data structure as the basis of the newly generated security behavior profile, as discussed above.

In general, creation module 106 may customize the creation of the security behavior profile based on the specific or unique position of the new actor within the weighted graph such that the security behavior profile is unique and/or substantially unique to the specific new actor. This contrasts with other systems that define expected behavior for members of a group of related or connected actors the same regardless of the specific or unique position of each member within the group. This also contrasts with other systems that define expected behavior for a member of a group based on previously recorded behavior of all members of the group including previously recorded behavior of the member itself (thereby excluding situations where no previous behavior has been recorded for the new actor yet). Notably, creation module 106 may exclude previous recorded behavior and/or a previous security behavior profile for the new actor from the calculation and generation of the new security behavior profile at least because creation module 106 will lack previously recorded behavior for the newly inserted actor.

Creation module 106 may also base the influence of a previous security behavior profile on a direction of an edge connection that connects the corresponding node to the new actor. For example, creation module 106 may assume that a superior of the new actor within an organizational hierarchy has more influence on the new actor than vice versa.

At step 308, one or more of the systems described herein may detect a security anomaly by comparing actual behavior of the new actor within the computing environment with the new security behavior profile that defines expected behavior for the new actor. For example, detection module 108 may, as part of server 206 in FIG. 2, detect security anomaly 216 by comparing actual behavior of new actor 210 within the computing environment with new security behavior profile 212 that defines expected behavior for new actor 210.

Detection module 108 may detect the security anomaly in a variety of ways. For example, detection module 108 may detect that a value, measurement, frequency, and/or count of an event and/or action, such as any of the events and actions listed above (i.e., in defining the security behavior profile) deviates from, exceeds, and/or violates one or more definitions or tolerances defined by the security behavior profile. Detection module 108 may attempt to detect the security anomaly periodically or continuously (e.g., according to a predefined schedule or interval). Detection module 108 may similarly attempt to detect the security anomaly proactively and/or in response to a request.

At step 310, one or more of the systems described herein may perform, as part of a computer security system, a remedial action in response to detecting the security anomaly. For example, performance module 110 may, as part of server 206 in FIG. 2, perform a remedial action in response to detecting security anomaly 216.

As used herein, the term "remedial action" generally refers to any action that a software security product may take autonomously, automatically, and/or semi-autonomously to protect users in response to detecting a candidate security event or anomaly, as discussed further below. Examples of remedial actions include blocking an attempted action by the new actor, warning the new actor, warning a user or administrator, quarantining a computing resource, setting limits or boundaries for the new actor, publicly reporting the detected anomaly, requesting or requiring authorization to perform an attempted action by the new actor, inhibiting or otherwise placing obstacles before the new actor attempts to perform an action, increasing one or more security measures to protect users and/or computing resources, notifying authorities, and/or any other remedial action that may prevent or ameliorate harm, damage, and/or annoyance caused by the detected security anomaly.

As explained above in connection with method 300 in FIG. 3, the systems and methods disclosed herein overcome the problem of generating security profiles of expected behavior for newly discovered actors when corresponding security systems have not yet recorded any previous actual behavior on which to base the security profiles. Specifically, the systems and methods disclosed herein may overcome that problem by leveraging the security profiles of graph neighbors as substitutes, models, and/or defaults for the newly discovered actors. Moreover, the systems and methods disclosed herein may also overcome the problem of expected behavior being defined the same for each member of a group of actors within a network computing environment. Specifically, the systems and methods disclosed herein may improve upon other methods by customizing or personalizing a security behavior profile that defines expected behavior based on the specific position of each user within a corresponding weighted graph.

Figure 5:
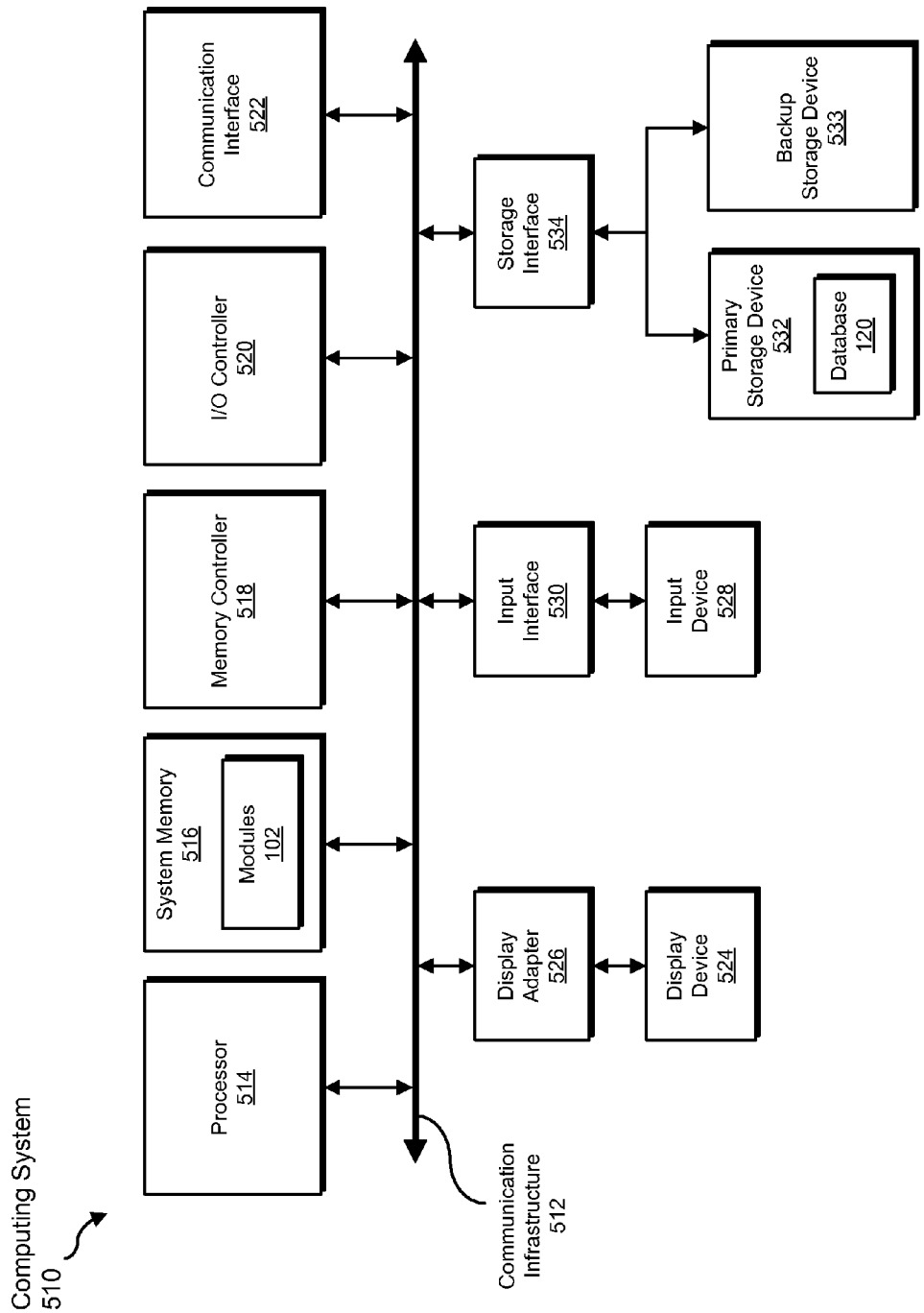
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533.

When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
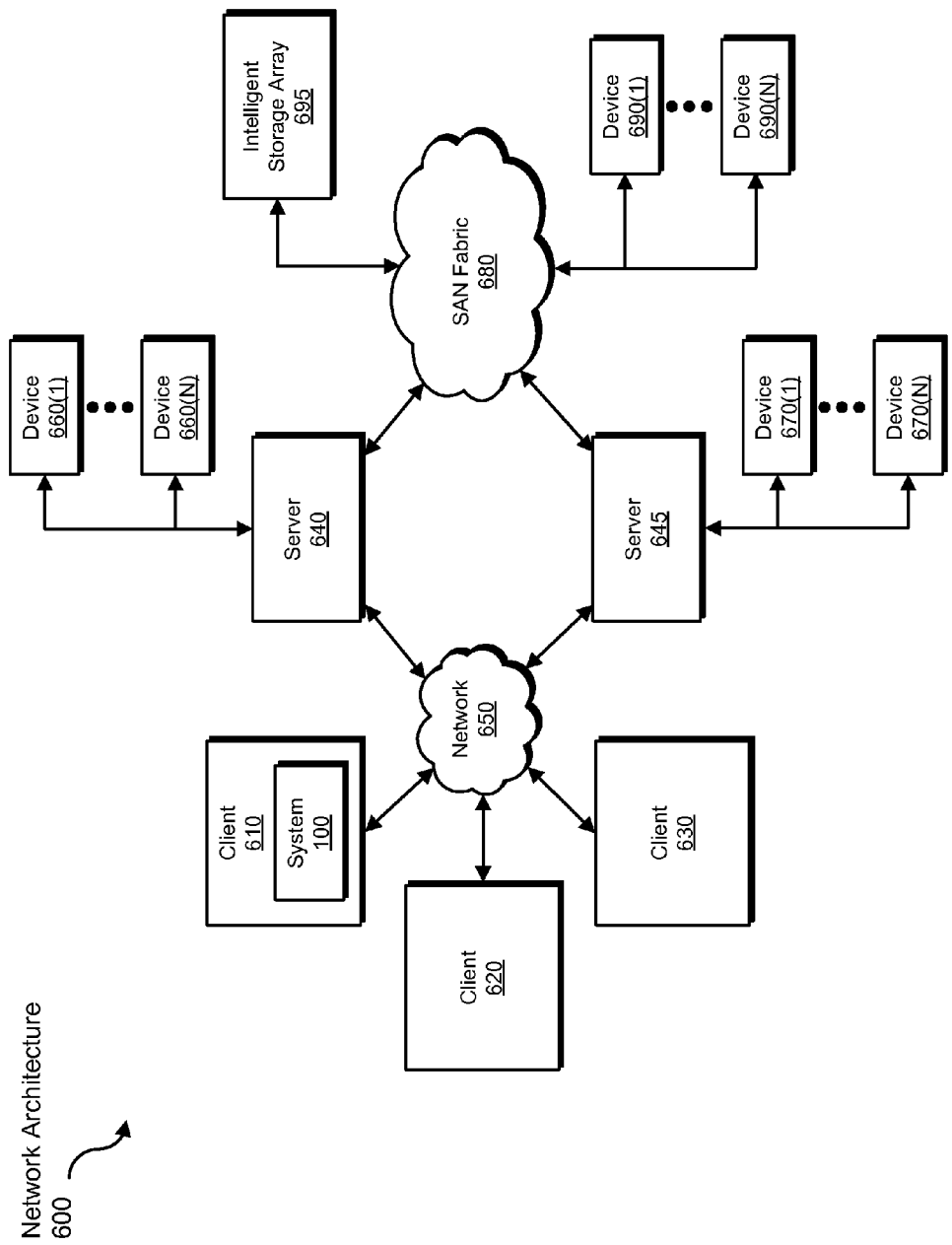
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for creating security profiles.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information identifying a new actor within a computing environment, a security behavior profile, and/or a weighted graph, to be transformed; transform the data by copying, adjusting, and/or generating a security behavior profile and/or weighted graph; output a result of the transformation to an output device, display, and/or printer; use the result of the transformation to protect users from security threats; and store the result of the transformation to memory or storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including"

and "having" (and their derivatives), as used in the specification and claims, are interchangeable with and have the same meaning as the word "comprising."

What is claimed is:

1. A computer-implemented method for creating security profiles, at least a portion of the method being performed by a computing device comprising at least one processor, the method comprising:
   identifying, within a computing environment, a new actor as a target for creating a new security behavior profile that defines expected behavior for the new actor;
   identifying a weighted graph that connects the new actor as a node to other actors;
   creating, by analyzing the weighted graph that connects the new actor to the other actors, the new security behavior profile that defines expected behavior for the new actor based on the new actor's specific position within the weighted graph at least in part by calculating an average edge value of connections that connect the new actor to neighbors within the weighted graph;
   detecting a security anomaly by comparing actual behavior of the new actor within the computing environment with the new security behavior profile that defines expected behavior for the new actor; and
   performing, by a computer security system, a remedial action in response to detecting the security anomaly.

2. The computer-implemented method of claim 1, wherein the new actor comprises one of:
   a user account; and
   a physical server.

3. The computer-implemented method of claim 1, wherein identifying, within the computing environment, the new actor as the target for creating the new security behavior profile comprises identifying the new actor as newly inserted within the computing environment.

4. The computer-implemented method of claim 1, wherein identifying the weighted graph that connects the new actor as the node to other actors comprises creating the weighted graph.

5. The computer-implemented method of claim 4, wherein creating the weighted graph comprises:
   identifying a data structure that indicates a position of the new actor within a network of actors having a same type categorization; and
   creating the weighted graph based on the data structure.

6. The computer-implemented method of claim 5, wherein the data structure comprises an organizational chart that indicates a hierarchy between individuals within a corresponding organization.

7. The computer-implemented method of claim 1, wherein creating the new security behavior profile based on the new actor's specific position within the weighted graph comprises copying another security behavior profile as the new security behavior profile.

8. The computer-implemented method of claim 7, wherein the new actor replaces another actor within the computing environment.

9. The computer-implemented method of claim 1, wherein the new actor comprises a file.

10. The computer-implemented method of claim 1, wherein detecting the security anomaly comprises determining that the actual behavior of the new actor differs from expected behavior defined by the new security behavior profile beyond a predefined threshold.

11. A system for creating security profiles, the system comprising:
    an identification module, stored in memory, that:
      identifies, within a computing environment, a new actor as a target for creating a new security behavior profile that defines expected behavior for the new actor; and
      identifies a weighted graph that connects the new actor as a node to other actors;
    a creation module, stored in memory, that creates, by analyzing the weighted graph that connects the new actor to the other actors, the new security behavior profile that defines expected behavior for the new actor based on the new actor's specific position within the weighted graph at least in part by calculating an average edge value of connections that connect the new actor to neighbors within the weighted graph;
    a detection module, stored in memory, that detects a security anomaly by comparing actual behavior of the new actor within the computing environment with the new security behavior profile that defines expected behavior for the new actor;
    a performance module, stored in memory, that performs a remedial action in response to detecting the security anomaly; and
    at least one physical processor configured to execute the identification module, the creation module, the detection module, and the performance module.

12. The system of claim 11, wherein the new actor comprises one of:
    a user account; and
    a physical server.

13. The system of claim 11, wherein the identification module identifies, within the computing environment, the new actor as the target for creating the new security behavior profile by identifying the new actor as newly inserted within the computing environment.

14. The system of claim 11, wherein the identification module identifies the weighted graph that connects the new actor as the node to other actors by creating the weighted graph.

15. The system of claim 14, wherein the creation module creates the weighted graph by:
    identifying a data structure that indicates a position of the new actor within a network of actors having a same type categorization; and
    creating the weighted graph based on the data structure.

16. The system of claim 15, wherein the data structure comprises an organizational chart that indicates a hierarchy between individuals within a corresponding organization.

17. The system of claim 11, wherein the creation module creates the new security behavior profile based on the new actor's specific position within the weighted graph by copying another security behavior profile as the new security behavior profile.

18. The system of claim 17, wherein the new actor replaces another actor within the computing environment.

19. The system of claim 11, wherein the new actor comprises a file.

20. A non-transitory computer-readable medium comprising one or more computer-readable instructions that, when executed by at least one processor of a computing device, cause the computing device to:
    identify, within a computing environment, a new actor as a target for creating a new security behavior profile that defines expected behavior for the new actor;
    identify a weighted graph that connects the new actor as a node to other actors;
    create, by analyzing the weighted graph that connects the new actor to the other actors, the new security behavior profile that defines expected behavior for the new actor based on the new actor's specific position within the weighted graph at least in part by calculating an average edge value of connections that connect the new actor to neighbors within the weighted graph;

detect a security anomaly by comparing actual behavior of the new actor within the computing environment with the new security behavior profile that defines expected behavior for the new actor; and perform, by a computer security system, a remedial action in response to detecting the security anomaly.

* * * * *